(12) United States Patent
Corey et al.

(10) Patent No.: US 11,555,977 B2
(45) Date of Patent: Jan. 17, 2023

(54) OPTICAL SYSTEM WITH ADJUSTMENT STAGE AND ASSOCIATED METHOD

(71) Applicant: EAGLE TECHNOLOGY, LLC, Melbourne, FL (US)

(72) Inventors: Christopher A. Corey, Palm Bay, FL (US); Steven F. Semenko, Malabar, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 524 days.

(21) Appl. No.: 16/549,561

(22) Filed: Aug. 23, 2019

(65) Prior Publication Data

US 2021/0055501 A1    Feb. 25, 2021

(51) Int. Cl.
| | |
|---|---|
| *G02B 7/02* | (2021.01) |
| *G21K 1/00* | (2006.01) |
| *G02B 7/04* | (2021.01) |
| *G06N 10/00* | (2022.01) |

(52) U.S. Cl.
CPC .............. *G02B 7/023* (2013.01); *G02B 7/04* (2013.01); *G06N 10/00* (2019.01); *G21K 1/006* (2013.01)

(58) Field of Classification Search
CPC ........ G02B 7/023; G02B 7/026; G02B 7/022; G02B 7/1824; G02B 7/1825; G02B 7/04; G06N 10/00; G21K 1/006
USPC .................................. 359/359, 811, 819–830
See application file for complete search history.

(56) References Cited

U.S. PATENT DOCUMENTS

| | | | | |
|---|---|---|---|---|
| 4,099,852 | A * | 7/1978 | Kobierecki | B25J 21/00 376/104 |
| 9,958,710 | B1 | 5/2018 | Morse et al. | |
| 9,958,711 | B1 | 5/2018 | Morse et al. | |
| 2013/0077168 | A1 | 3/2013 | Gutierrez et al. | |
| 2018/0173027 | A1* | 6/2018 | Morse | G02F 1/113 |
| 2018/0203265 | A1 | 7/2018 | Morse et al. | |
| 2018/0203325 | A1 | 7/2018 | Wasilousky et al. | |
| 2018/0299745 | A1 | 10/2018 | Morse et al. | |

FOREIGN PATENT DOCUMENTS

| | | |
|---|---|---|
| CN | 107765391 | 3/2018 |
| CN | 207650474 | 7/2018 |
| EP | 0179426 | 10/1991 |
| JP | S6246164 Y2 * | 11/1987 |
| JP | 5350285 | 8/2013 |
| WO | WO2007034174 | 3/2007 |

* cited by examiner

*Primary Examiner* — Marin Pichler
(74) *Attorney, Agent, or Firm* — Allen, Dyer, Doppelt + Gilchrist, P.A.

(57) ABSTRACT

An optical system may include a target, a laser source, and an optical lens assembly. The optical lens assembly may include a mounting flange mounted adjacent the laser source, an objective lens aligned between the laser source and the target, and at least one adjustment stage coupled between the mounting flange and the objective lens. The adjustment stage may include a ball joint having a ball joint body, a ball receiver tube, and adjustable fasteners coupling the ball joint body to the ball receiver tube. The adjustment stage may include a translation tube having ramps thereon, and adjustable fasteners coupled between the mounting flange and the translation tube. In addition, the adjustment stage may include the mounting flange having a threaded surface thereon, and a focus ring rotatably coupled to the threaded surface of the mounting flange.

26 Claims, 6 Drawing Sheets

OPTICAL SYSTEM WITH ADJUSTMENT STAGE AND ASSOCIATED METHOD

FIELD

The present invention relates to the field of optical assemblies, and, more particularly, to an optical system and associated method.

BACKGROUND

Ion trap quantum computing uses highly precise alignment of the final "atom imager" objective lens. For example, this may include thirty-two telecentric beams targeting an array of thirty-two individual atoms. The location in all three axes (x, y, z) is desirable controlled to within <50 um, for example. In addition, the beam angle in the x and y direction (pitch and yaw) may be controlled within 10 mrad.

System architecture often means that these beams travel horizontally to skim the top of the ion trap. A relatively small (e.g., 4.5 um) spot size uses a relatively high numerical aperture (NA) objective. Further, there may be significant restriction of physical space for the mechanism typically used to adjust the alignment.

Previous systems attempted to address these problems by using a Gough-Stewart Platform (Hexapod) mounted outside the vacuum chamber. Beams were planned to enter the chamber from below using a relatively large reentrant window. The vertical beam orientation meant overhanging loads (moments) on the manipulator were not desirable.

Despite the existence of such configurations, further advancements in optical systems may be desirable in certain applications, such as quantum computing, for example.

SUMMARY

An optical system includes a target, a laser source, and an optical lens assembly. The optical lens assembly may include a mounting flange mounted adjacent the target, an objective lens aligned between the laser source and the target, and at least one adjustment stage coupled between the mounting flange and the objective lens. The target may comprise an atom (e.g. ion) trap or a semiconductor mask, for example.

The at least one adjustment stage may comprise a ball joint defining an angle adjustment stage. The ball joint may include a ball joint body, a ball receiver tube, and adjustable fasteners coupling the ball joint body to the ball receiver tube. In addition, the ball joint may include at least one angle stop coupled between the ball joint body and the ball receiver tube.

The least one adjustment stage may include a translation adjustment stage, where the translation adjustment stage comprises a translation tube having a plurality of ramps thereon, and a plurality of adjustable fasteners coupled between the mounting flange and the translation tube.

In addition, the at least one adjustment stage may comprise a focus adjustment stage, where the mounting flange comprises a threaded surface thereon, and the focus adjustment stage comprises a focus ring rotatably coupled to the threaded surface of the mounting flange.

Another aspect relates to a quantum computing system having an atom trap, a laser source configured to generate a plurality of laser beams, and an optical lens assembly. The optical lens assembly comprises a mounting flange to be mounted adjacent the ion trap, an objective lens to be aligned between the laser source and the atom trap, and at least one adjustment stage coupled between the mounting flange and the objective lens. The at least one adjustment stage may comprise a ball joint defining an angle adjustment stage.

Another aspect relates to a method of using an optical lens assembly, where the optical assembly includes a mounting flange mounted adjacent to a target, an objective lens aligned between a laser source and the target, and at least one adjustment stage coupled between the mounting flange and the objective lens. The at least one adjustment stage includes a ball joint defining an angle adjustment stage. The method may include adjusting an angle of the objective lens with the ball joint, where the ball joint may comprise a ball receiver tube, and adjustable angle fasteners coupling the ball joint body to the ball receiver tube.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
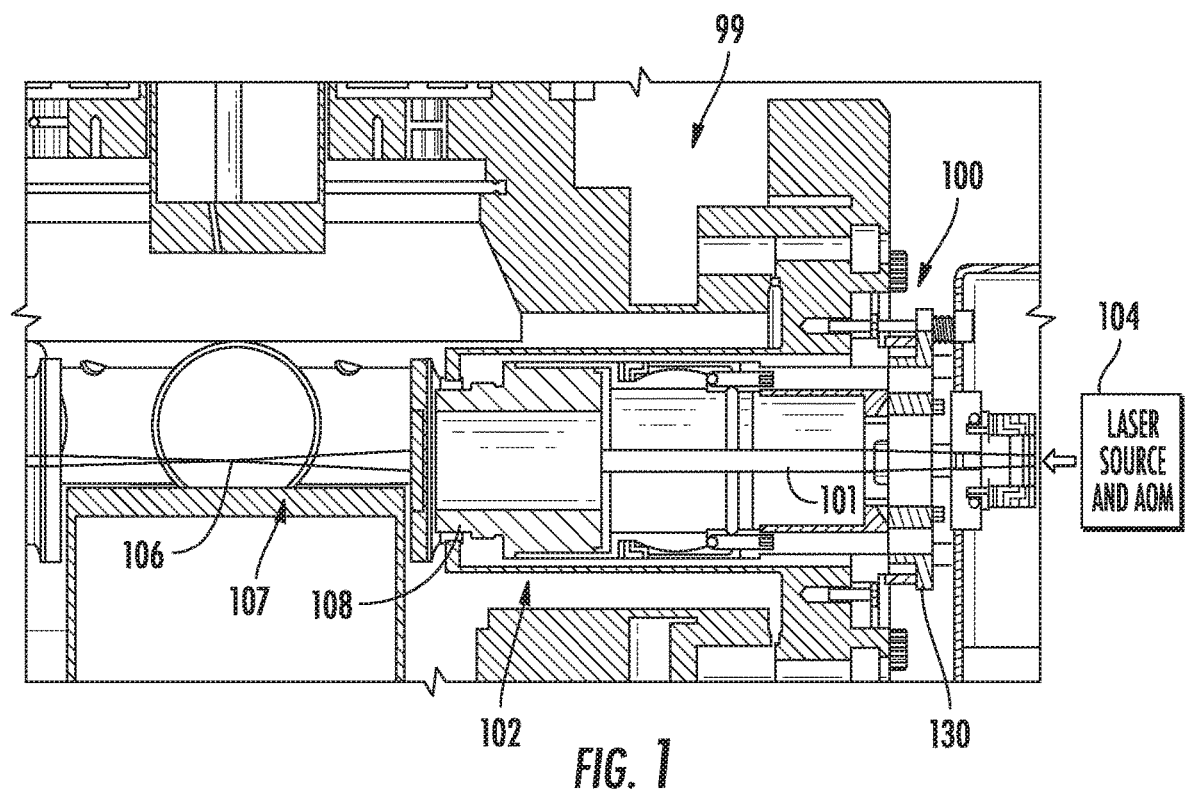
FIG. 1 is a cross sectional view of a portion of a quantum computer including an optical system according to the invention.
Figure 2:
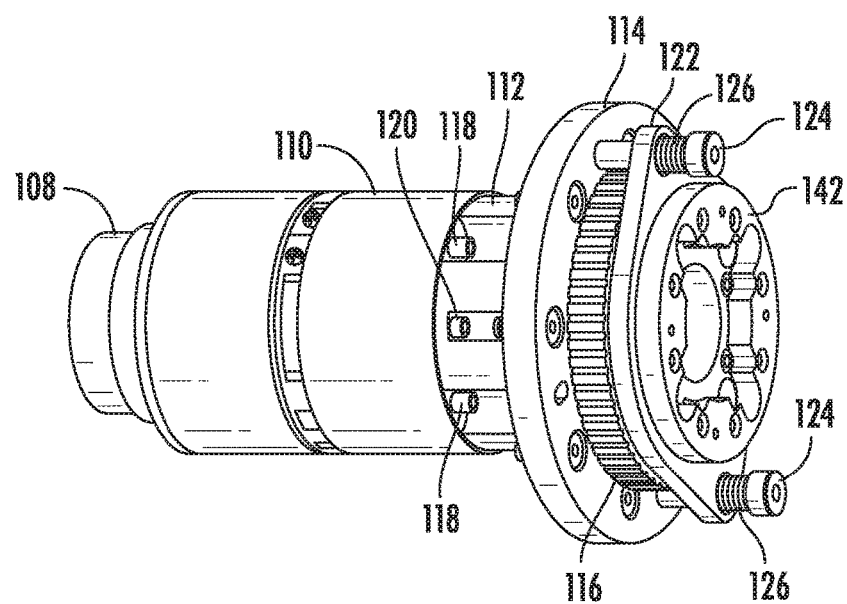
FIG. 2 is a perspective view of the optical lens assembly of the optical system of FIG. 1.

Referring initially to FIGS. 1 and 2, an optical system is generally designated 100 and is part of a quantum computing system 99. The optical system 100 includes an optical lens assembly 102, a laser source and associated acousto-optic modulator (AOM) 104, and a target in the form of atoms (ions) 106 within an atom trap 107 to define the quantum computing system 99. The optical lens system 100 satisfies tightly controlled telecentricity, distortion, and spot size requirements. The optical system 100 may be capable of supporting large overhanging moments and may be implemented on a variety of ion trap illumination applications, for example. The optical system 100 may also be adapted to fiber-coupling for acousto-optic (AO) devices. The ability to provide fiber-coupled acousto-optic modulators (AOMs) may become increasingly important as the quantum computing industry grows.

Examples of acousto-optic modulator devices and similar acousto-optic systems are disclosed in commonly assigned U.S. Pat. Nos. 9,958,710 and 9,958,711; and published U.S. Applications 2018/0173027, 2018/0203265, 2018/0203325, and 2018/0299745, the disclosures of which are hereby incorporated by reference in their entireties. Accordingly, the optical system 100 allows work over a large spectrum. The optical system 100 may accordingly provide advantages with respect to numerous different types of targets.

The optical lens system 100 includes five axes of adjustment resulting in two degrees of rotational freedom and three in translation for the final imaging objective as described in more detail below. The z-axis is defined in the direction of the laser source 104 to the target 106. The laser source 104 generates a plurality of laser beams 101. The five axes of adjustment include θx, θy, Δx, Δy, and Δz, and are kinematically orthogonal (non-synergistic). In addition, a large central aperture (>80% of total diameter) allows for clearance at extremes of adjustment. The optical lens system 100 may be manually actuated and includes inherently self-locking adjustments for the five axes of adjustment. The adjustments are accessible from one side of the system 100.

The optical lens assembly 102 includes a mounting flange 114 mounted adjacent to the laser source 104 as shown in FIG. 1. An objective lens 108 is aligned between the laser source 104 and the target 106.

The optical lens assembly 102 features high precision and includes kinematically independent adjustments for each degree of freedom. In particular, at least one adjustment stage 105 is coupled between the mounting flange 114 and the objective lens 108. The adjustment resolutions for the optical system 100 may be θx, θy: 1.5 mrad; Δx, Δy: 20 µm; Δz: 30 µm. The optical lens assembly has at least one angle stop 132a, 132b on the angle adjustment stage 111 (θx, θy) and can be replaced to prevent inadvertent contact with the vacuum chamber 130. In addition, the optical lens system 100 includes an annular mechanism with a useable aperture comprising greater than 50% of its total size.

Figure 3:
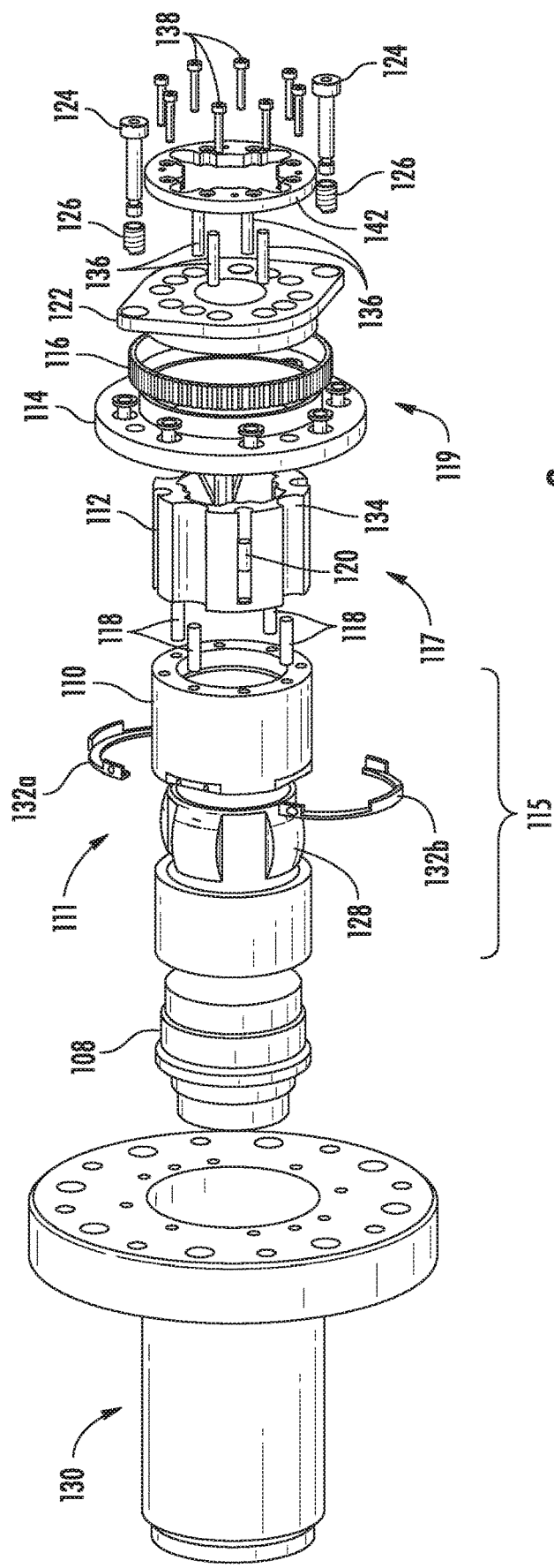
FIG. 3 is an exploded perspective view of the optical lens assembly of FIG. 2.

Referring now to FIG. 3, one adjustment stage for the optical lens assembly 102 is configured to adjust the angle (θx, θy) of the objective lens 108 relative to the target 106. The adjustment stage may include a ball joint 115 that defines an angle adjustment stage 111. The ball joint 115 has a passageway therethrough aligned along the path of the laser beams 101 between the laser source 104 and the target 106 (FIG. 1). The ball joint 115 includes a ball joint body 128, a ball receiver tube 110, and adjustable angle fasteners 118 coupling the ball joint body 128 to the ball receiver tube 110. In addition, the ball joint 115 may include the angle stops 132a, 132b coupled between the ball joint body 128 and the ball receiver tube 110. The applicable adjustable angle fasteners 118 are adjusted by rotation, for example, to cause the objective lens 108 to tilt in the desired direction relative to the target 106.

Another adjustment stage may be a translation adjustment stage 117, to adjust the objective lens 108 along the x-axis and y-axis. The translation adjustment stage 117 comprises a translation tube 112 having a plurality of ramps 134 thereon, and a plurality of adjustable translation fasteners 136 coupled between the mounting flange 114 and the translation tube 112. The applicable adjustable translation fasteners 136 are rotated, for example, to cause the objective lens 108 to move in the x- or y-direction relative to the target 106. The translation tube 112 is secured to the ball receiver tube 110 using fasteners 120.

Yet another adjustment stage may include a focus adjustment stage 119 to provide adjustment along the z-axis. The mounting flange 114 includes a threaded surface 121 and a focus ring 116 rotatably coupled to the threaded surface 121 to define the focus adjustment stage 119. As the focus ring 116 is rotated, the objective lens 108 is moved along the z-axis relative to the target 106.

The scan plate 122 is secured to the mounting flange 114 using bolts 124 with each bolt 124 having a spring 126 to preload the focus ring 116. The bolts 124 can be loosened to rotate the focus ring 116. A clamp plate 142 is secured using the clamp screws 138.

Figure 4:
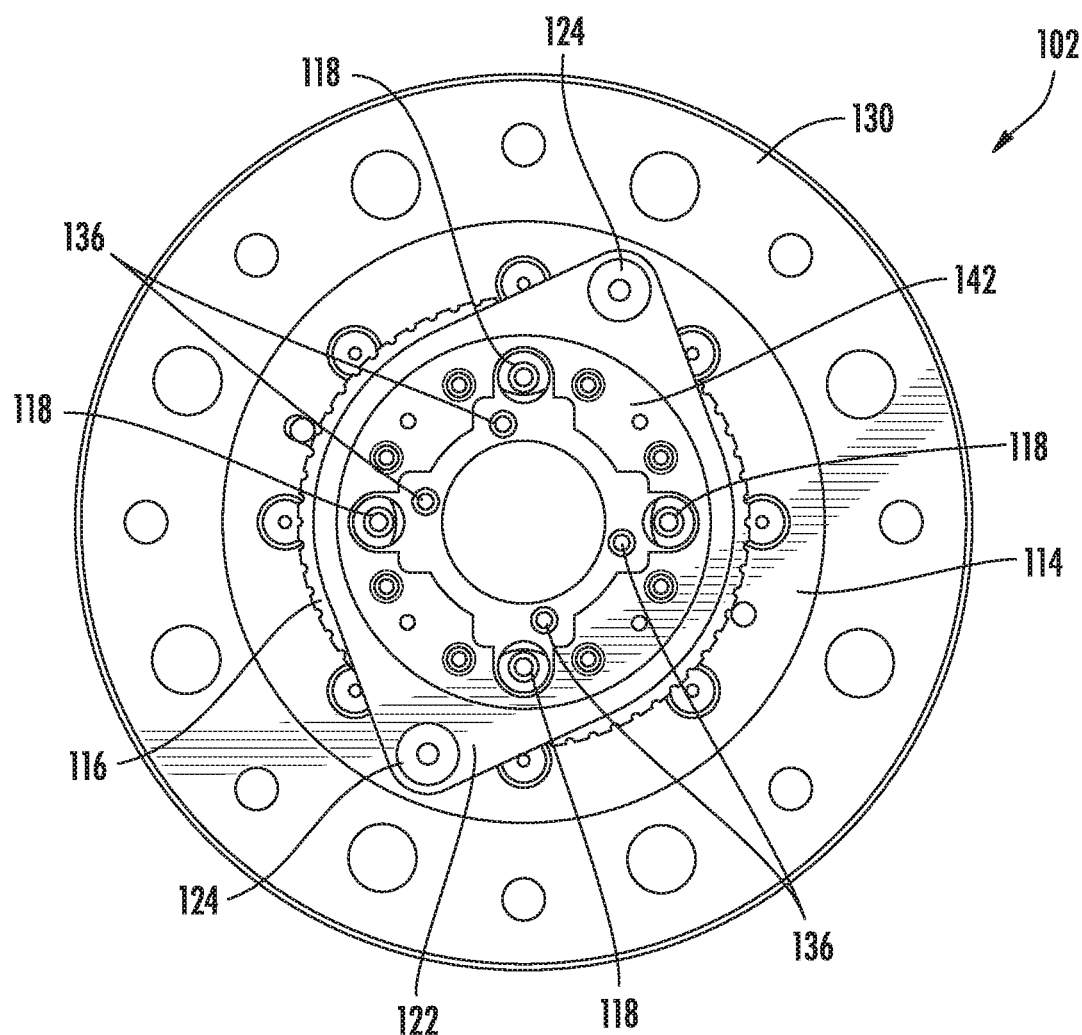
FIG. 4 is an end view of the optical lens assembly of FIG. 2.

Referring now to FIG. 4, the adjustable angular fasteners 118 are accessible by placing an adjustment tool such as a screwdriver, for example, through the scan plate 122 and mounting flange 114. The adjustable translation fasteners 136 are accessible at the scan plate 122 and the scan plate is tapped for the adjustable translation fasteners 136.

Figure 5:
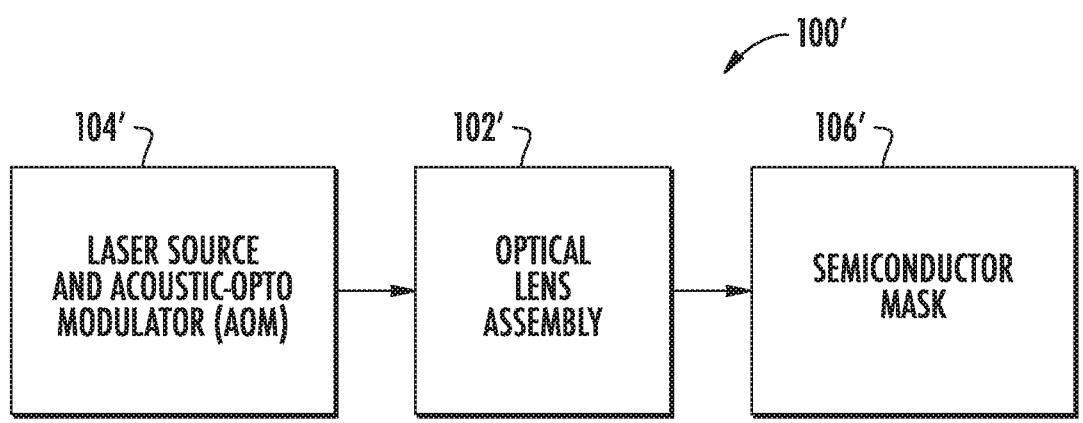
FIG. 5 is a block diagram of an optical system where the target is a semiconductor mask according to the invention.

With reference to FIG. 5, the optical lens system 100' may be used in an application where the target comprises a semiconductor mask 106'. The laser source 104' is directed to the semiconductor mask 106' with the optical lens assembly 102' therebetween.

Figure 6:
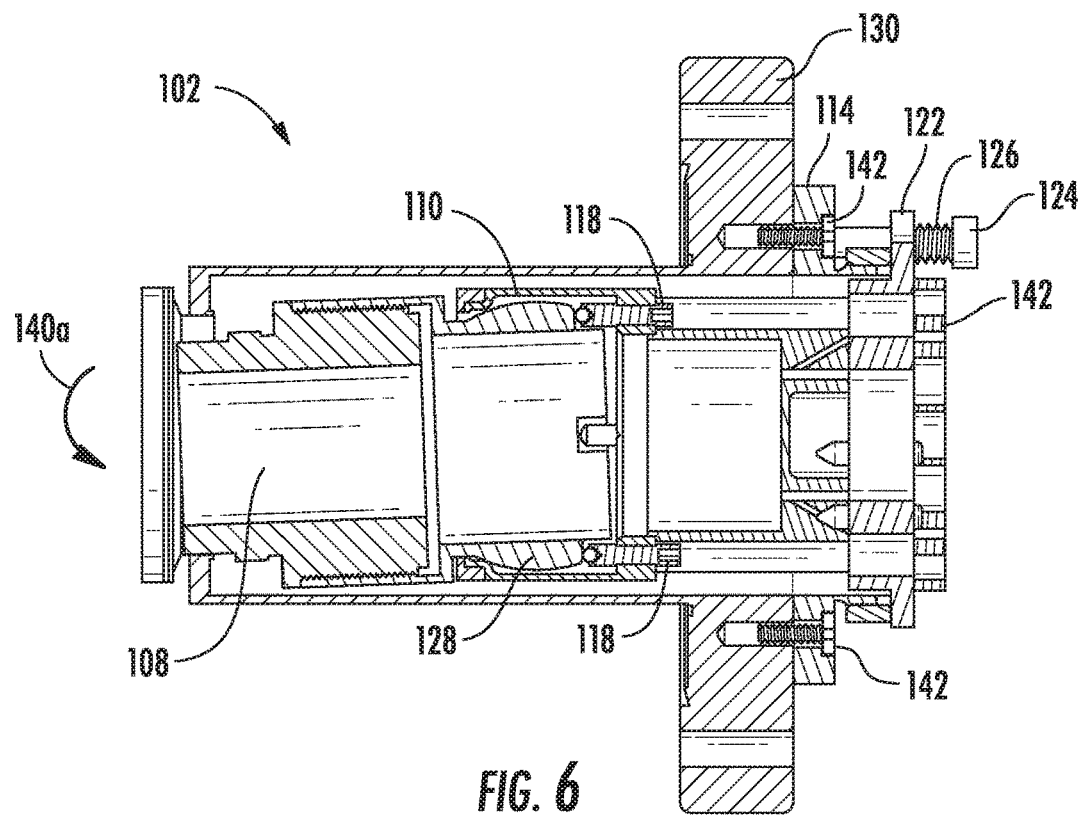
FIG. 6 is a cross sectional view of the optical lens assembly of FIG. 2 with the objective lens being adjusted to angle downward.
Figure 7:
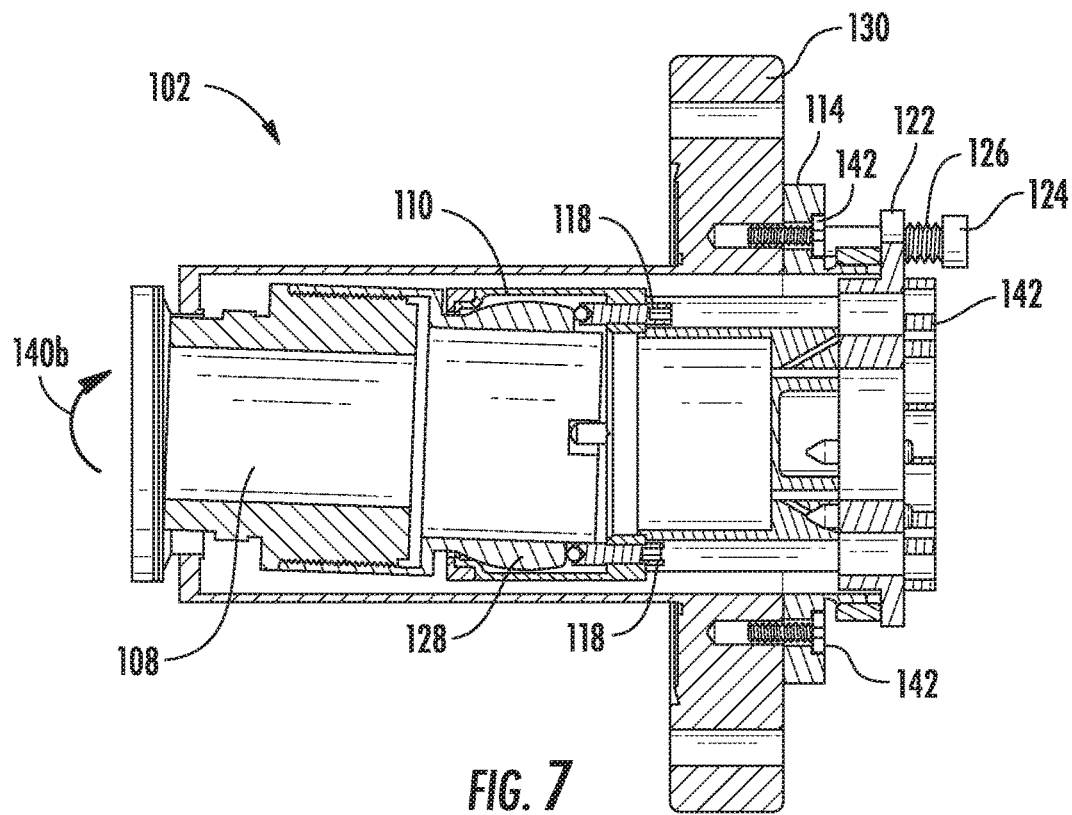
FIG. 7 is a cross sectional view of the optical lens assembly of FIG. 2 with the objective lens being adjusted to angle upward.
Figure 8:
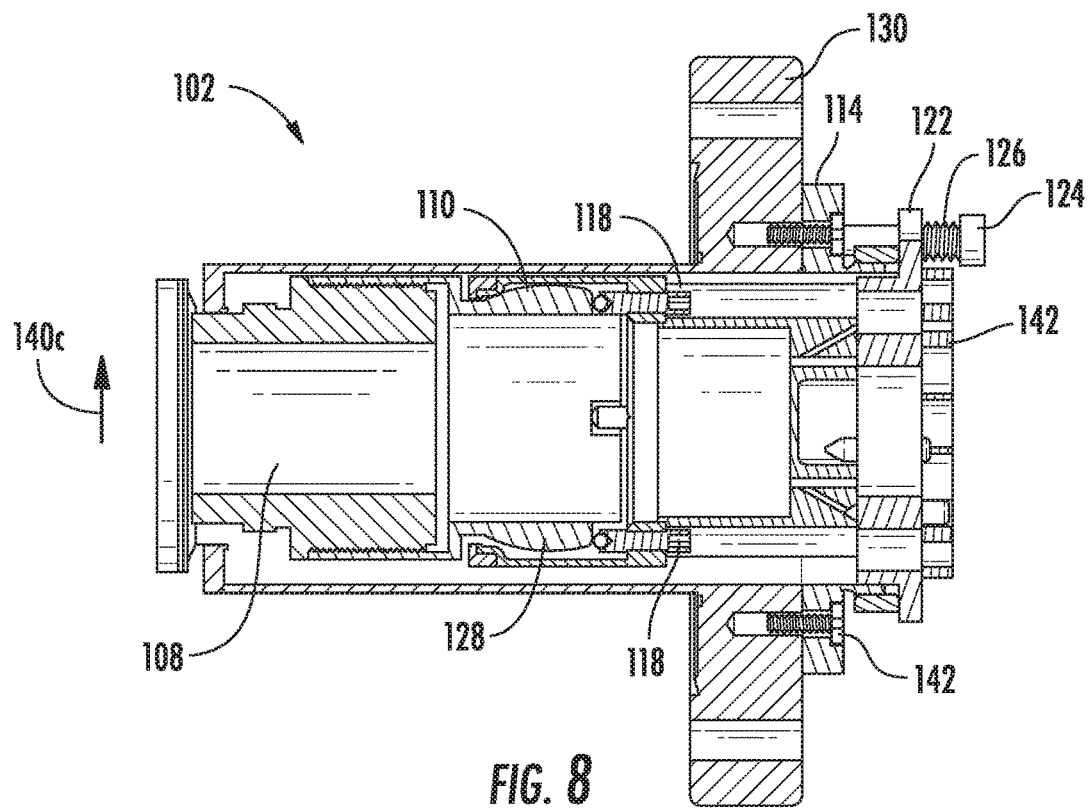
FIG. 8 is a cross sectional view of the optical lens assembly of FIG. 2 with the objective lens being adjusted upward.
Figure 9:
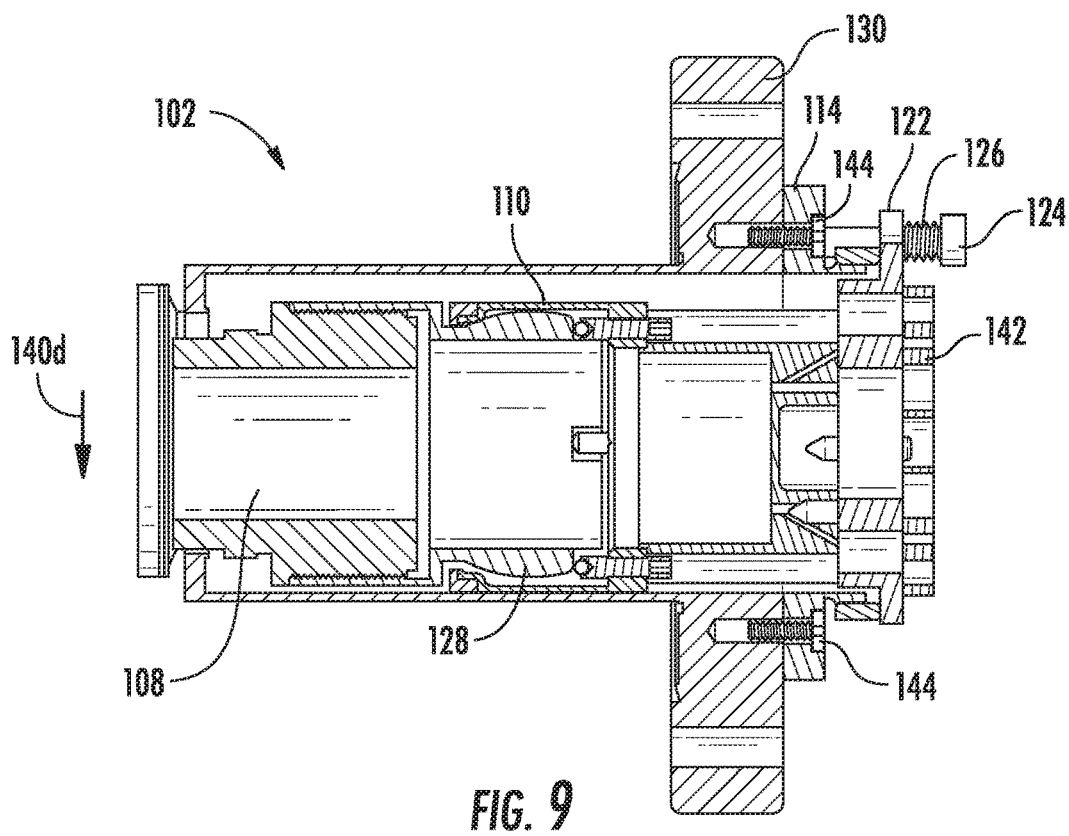
FIG. 9 is a cross sectional view of the optical lens assembly of FIG. 2 with the objective lens being adjusted downward.

Referring now to FIGS. 6-9, the adjustability of the optical lens assembly 102 is further explained. For example, FIG. 6 depicts the objective lens 108 being adjusted to tilt downward in the direction 140a relative to the target 106 using the adjustable angle fasteners 118. Similarly, FIG. 7 depicts the objective lens 108 being adjusted to tilt upward in the direction 140b relative to the target 106. FIG. 8 depicts the objective lens 108 being adjusted up in the y-direction 140c relative to the target 106 using the adjustable translation screws 136. FIG. 9 depicts the objective lens 108 being adjusting down in the y-direction 140d relative to the target 106. As those of ordinary skill in the art can appreciate, the objective lens 108 can similarly be adjusted in the ex direction and along the x-axis and the z-axis.

Figure 10:
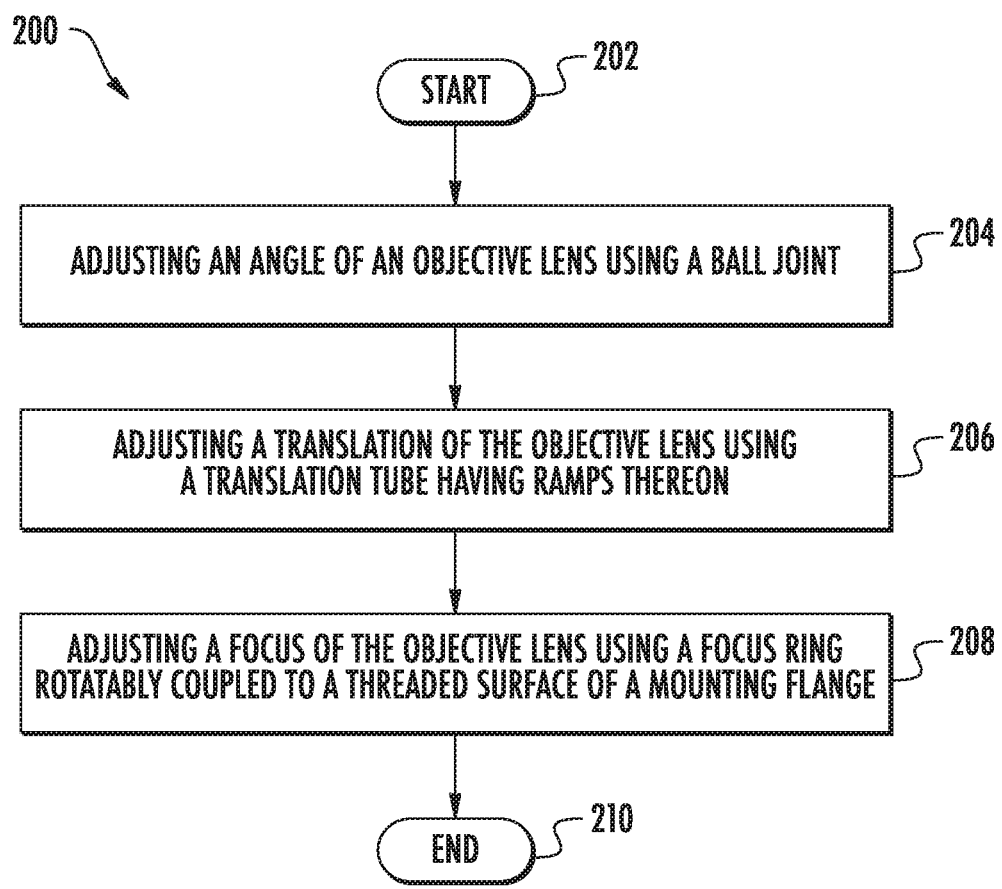
FIG. 10 is a flowchart of a method of using the optical system of FIG. 1.

Referring now to the flowchart 200 of FIG. 10, in accordance with another aspect, is a method of using an optical lens assembly as described above. The optical lens assembly includes a mounting flange mounted adjacent to a target, an objective lens aligned between a laser source and the target, and at least one adjustment stage coupled between the mounting flange and the objective lens. The at least one adjustment stage includes a ball joint defining an angle adjustment stage.

From the start at Block 202, the method 200 includes adjusting an angle of the objective lens with the ball joint (Block 204), where the ball joint may have a ball receiver tube, and adjustable angle fasteners coupling the ball joint body to the ball receiver tube. Moving to Block 206, the method includes adjusting a translation of the objective lens using a translation tube having ramps thereon, where adjustable translation fasteners are coupled between the mounting flange and the translation tube. In addition, the method includes adjusting, at Block 208, a focus of the objective lens using a focus ring rotatably coupled to a threaded surface of the mounting flange. The method ends at Block 210.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An optical system comprising:
    a target;
    a laser source; and
    an optical lens assembly comprising
        a mounting flange mounted adjacent the laser source,
        an objective lens aligned between the laser source and the target, and
        at least one adjustment stage coupled between the mounting flange and the objective lens, the at least one adjustment stage comprising a ball joint defining an angle adjustment stage, the ball joint comprising a ball receiver tube and a ball joint body inserted therein and the ball joint body having a passageway therethrough aligned between the laser source and the target.

2. The optical system of claim 1 wherein the ball joint comprises a plurality of adjustable fasteners coupling the ball joint body to the ball receiver tube.

3. The optical system of claim 2 wherein the ball joint comprises at least one angle stop coupled between the ball joint body and the ball receiver tube.

4. The optical system of claim 1 wherein the at least one adjustment stage comprises a translation adjustment stage.

5. The optical system of claim 4 wherein the translation adjustment stage comprises a translation tube having a plurality of ramps thereon, and a plurality of adjustable fasteners coupled between the mounting flange and the translation tube.

6. The optical system of claim 1 wherein the at least one adjustment stage comprises a focus adjustment stage.

7. The optical system of claim 6 wherein the mounting flange comprises a threaded surface thereon; and wherein the focus adjustment stage comprises a focus ring rotatably coupled to the threaded surface of the mounting flange.

8. The optical system of claim 1 wherein the target comprises an atom trap.

9. The optical system of claim 1 wherein the target comprises a semiconductor mask.

10. A quantum computing system comprising:
    an atom trap;
    a laser source configured to generate a plurality of laser beams; and
    an optical lens assembly comprising
        a mounting flange mounted adjacent the laser source,
        an objective lens aligned between the laser source and the atom trap, and
        at least one adjustment stage coupled between the mounting flange and the objective lens, the at least one adjustment stage comprising a ball joint defining an angle adjustment stage, the ball joint comprising a ball receiver tube and a ball joint body inserted therein and the ball joint body having a passageway therethrough aligned between the laser source and the atom trap.

11. The quantum computing system of claim 10 wherein the ball joint comprises a plurality of adjustable fasteners coupling the ball joint body to the ball receiver tube.

12. The quantum computing system of claim 11 wherein the ball joint comprises at least one angle stop coupled between the ball joint body and the ball receiver tube.

13. The quantum computing system of claim 10 wherein the at least one adjustment stage comprises a translation adjustment stage.

14. The quantum computing system of claim 13 wherein the translation adjustment stage comprises a translation tube having a plurality of ramps thereon, and a plurality of adjustable fasteners coupled between the mounting flange and the translation tube.

15. The quantum computing system of claim 10 wherein the at least one adjustment stage comprises a focus adjustment stage.

16. The quantum computing system of claim 15 wherein the mounting flange comprises a threaded surface thereon; and wherein the focus adjustment stage comprises a focus ring rotatably coupled to the threaded surface of the mounting flange.

17. An optical lens assembly for an optical system comprising a target and a laser source, the optical lens assembly comprising:
    a mounting flange to be mounted adjacent the laser source;
    an objective lens to be aligned between the laser source and the target; and
    at least one adjustment stage coupled between the mounting flange and the objective lens, the at least one adjustment stage comprising a ball joint defining an angle adjustment stage, the ball joint comprising a ball receiver tube and a ball joint body inserted therein and the ball joint body having a passageway therethrough to be aligned between the laser source and the target.

18. The optical system of claim 17 wherein the ball joint comprises a plurality of adjustable fasteners coupling the ball joint body to the ball receiver tube.

19. The optical system of claim 18 wherein the ball joint comprises at least one angle stop coupled between the ball joint body and the ball receiver tube.

20. The optical system of claim 17 wherein the at least one adjustment stage comprises a translation adjustment stage.

21. The optical system of claim 20 wherein the translation adjustment stage comprises a translation tube having a plurality of ramps thereon, and a plurality of adjustable fasteners coupled between the mounting flange and the translation tube.

22. The optical system of claim 17 wherein the at least one adjustment stage comprises a focus adjustment stage.

23. The optical system of claim 22 wherein the mounting flange comprises a threaded surface thereon; and wherein the focus adjustment stage comprises a focus ring rotatably coupled to the threaded surface of the mounting flange.

24. A method of using an optical lens assembly comprising a mounting flange mounted adjacent to a laser source, an objective lens aligned between a laser source and the target, and at least one adjustment stage coupled between the mounting flange and the objective lens, the at least one adjustment stage comprising a ball joint defining an angle adjustment stage, the method comprising:
    adjusting an angle of the objective lens with the ball joint, the ball joint comprising a ball receiver tube and a ball joint body inserted therein, and a plurality of adjustable angle fasteners coupling the ball joint body to the ball receiver tube, the ball joint having a passageway therethrough aligned between the laser source and the target.

25. The method of claim 24 comprising adjusting a translation of the objective lens using a translation tube having a plurality of ramps thereon, and a plurality of adjustable translation fasteners coupled between the mounting flange and the translation tube.

26. The method of claim 24 comprising adjusting a focus of the objective lens using a focus ring rotatably coupled to a threaded surface of the mounting flange.

\* \* \* \* \*